(12) United States Patent
Ke et al.

(10) Patent No.: US 12,422,945 B2
(45) Date of Patent: *Sep. 23, 2025

(54) STYLUS, TOUCH DEVICE, AND TOUCH PROCESSING CIRCUIT

(71) Applicant: Novatek Microelectronics Corp., Hsinchu (TW)

(72) Inventors: Chih-Yang Ke, Tainan (TW); Wei-Ren Chang, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,790

(22) Filed: Dec. 14, 2023

(65) Prior Publication Data
US 2024/0295935 A1    Sep. 5, 2024

Related U.S. Application Data

(63) Continuation-in-part of application No. 18/178,518, filed on Mar. 5, 2023, now abandoned.

(51) Int. Cl.
*G06F 3/041*    (2006.01)
*G06F 3/0354*    (2013.01)
(Continued)

(52) U.S. Cl.
CPC ...... *G06F 3/04162* (2019.05); *G06F 3/03545* (2013.01); *G06F 3/0383* (2013.01);
(Continued)

(58) Field of Classification Search
CPC ............. G06F 3/04162; G06F 3/03545; G06F 3/0383; G06F 3/0441; G06F 3/0442; G06F 3/04166; G06F 3/041; H04W 72/23
See application file for complete search history.

(56) References Cited

U.S. PATENT DOCUMENTS 8,638,320 B2 *   1/2014  Harley ............... G06F 3/0442
                                                           345/173
9,958,990 B2 *   5/2018  Yilmaz ............... G06F 3/0446
                         (Continued)

FOREIGN PATENT DOCUMENTS

CN    109643176    4/2019
CN    108803900    11/2021
CN    109478108    4/2022

OTHER PUBLICATIONS

"Office Action of Taiwan Counterpart Application", issued on Jan. 10, 2025, p. 1-p. 11.
(Continued)

*Primary Examiner* — Lunyi Lao
*Assistant Examiner* — Jarurat Suteerawongsa
(74) *Attorney, Agent, or Firm* — JCIPRNET (57) ABSTRACT

A stylus, a touch device, and a touch processing circuit are provided. The stylus includes a holding portion and a first transmission electrode. The first transmission electrode is disposed on the holding portion. The touch device includes a touch panel and a touch processing circuit. The touch processing circuit is coupled to the touch panel. The first transmission electrode transmits a first downlink signal to the touch device. The first downlink signal is used to determine a touch event that the stylus is laid on the touch panel. The touch processing circuit receives at least one first downlink signal from the holding portion of the stylus through the touch panel. The touch processing circuit is configured to determine the touch event that the stylus is laid on the touch panel based on the first downlink signal.

20 Claims, 10 Drawing Sheets

(51) Int. Cl.
   *G06F 3/038*   (2013.01)
   *G06F 3/044*   (2006.01)
   *H04W 72/23*  (2023.01)

(52) U.S. Cl.
   CPC .......... *G06F 3/0441* (2019.05); *G06F 3/0442* (2019.05); *H04W 72/23* (2023.01)

(56) References Cited

U.S. PATENT DOCUMENTS

| | | |
|---|---|---|
| 9,965,060 B1 | 5/2018 | Yeh et al. |
| 10,025,403 B2 | 7/2018 | Haran et al. |
| 11,137,840 B1 | 10/2021 | Han et al. |
| 2004/0169439 A1 | 9/2004 | Toda |
| 2018/0024651 A1 | 1/2018 | Haran et al. |
| 2018/0314364 A1 | 11/2018 | Yeh |
| 2019/0163320 A1* | 5/2019 | Park ...................... G06F 3/03545 |
| 2019/0310735 A1* | 10/2019 | Li ........................ G06F 3/0418 |
| 2020/0042113 A1 | 2/2020 | Chen |
| 2021/0165522 A1* | 6/2021 | Chou .................... G06F 3/0383 |
| 2021/0286450 A1* | 9/2021 | Han ...................... G06F 3/0383 |

OTHER PUBLICATIONS

"Office Action of Taiwan Counterpart Application", issued on May 23, 2025, p. 1-p. 11.

\* cited by examiner

STYLUS, TOUCH DEVICE, AND TOUCH PROCESSING CIRCUIT

CROSS-REFERENCE TO RELATED APPLICATION

This application is a continuation-in-part application of and claims the priority benefit of U.S. application Ser. No. 18/178,518, filed on Mar. 5, 2023, now pending. The entirety of the above-mentioned patent application is hereby incorporated by reference herein and made a part of this specification.

BACKGROUND

Technical Field

The disclosure relates to an electronic equipment, and in particular to a stylus, a touch device, and a touch processing circuit.

Description of Related Art

More and more electronic equipment (for example, touch devices such as laptops, tablet computers, and mobile phones) are equipped with active stylus to provide users with more human-computer interaction manners. The user may hold the active stylus to write on the touch panel of the touch device. When the active stylus held by the hand approaches the touch panel, the palm (or the wrist) usually touches the touch panel first, and the active stylus then touches the touch panel. The contact area (the false touch area) of the palm (or the wrist) on the touch panel should be ignored. Since the false touch area of the palm (or the wrist) is not large in the case where the hand holds the active stylus, there is no discrimination between the false touch area and the normal finger operation gesture (for example, a single finger quick swipe or a single finger quick click) from the signal surface. The system may falsely report the touch coordinates of the false touch area.

In addition, under a normal operation, the user may place the stylus on the touch panel, and the touch device should not report the touch location of the stylus or should stabilize the stylus's cursor to provide a good user experience. How to effectively identify the touch event that the stylus is laid on the touch panel of the touch device is one of many technical issues in the art.

SUMMARY

The disclosure provides a stylus, a touch device, and a touch processing circuit, so as to effectively identify the touch event that the stylus is laid on the touch panel of the touch device.

In an embodiment of the disclosure, a stylus includes a holding portion and a first transmission electrode. The first transmission electrode is disposed on the holding portion. The first transmission electrode transmits at least one first downlink signal to a touch device. The at least one first downlink signal is used to determine a touch event that the stylus is laid on a touch panel of the touch device.

In an embodiment of the disclosure, a touch device includes a touch panel and a touch processing circuit. The touch processing circuit is coupled to the touch panel. The touch processing circuit receives at least one first downlink signal from a holding portion of a stylus through the touch panel, wherein the touch processing circuit is configured to determine a touch event that the stylus is laid on the touch panel based on the at least one first downlink signal.

In an embodiment of the disclosure, the touch processing circuit includes a driving circuit and a microcontroller. The driving circuit is couple to a touch panel. The driving circuit receives at least one first downlink signal from a holding portion of a stylus through the touch panel. The microcontroller is coupled to the driving circuit. The microcontroller is configured to determine a touch event that the stylus is laid on the touch panel based on the at least one first downlink signal.

In order for the features and advantages of the disclosure to be more comprehensible, the following specific embodiments are described in detail in conjunction with the drawings.

DETAILED DESCRIPTION OF DISCLOSED EMBODIMENTS

The term "coupling (or connection)" used in the entire specification (including the claims) of the disclosure may refer to any direct or indirect connection means. For example, if a first device is described as being coupled (or connected) to a second device, it should be interpreted that the first device may be directly connected to the second device or the first device may be indirectly connected to the second device through another device or certain connection means. Terms such as "first" and "second" mentioned in the entire specification (including the claims) of the disclosure are used to name the elements or to distinguish between different embodiments or ranges, but not to limit the upper limit or the lower limit of the number of elements or to limit the sequence of the elements. In addition, wherever possible, elements/components/steps using the same reference numerals in the drawings and the implementation manners represent the same or similar parts. Related descriptions of the elements/components/steps using the same reference numerals or using the same terminologies in different embodiments may be cross-referenced.

Figure 1:
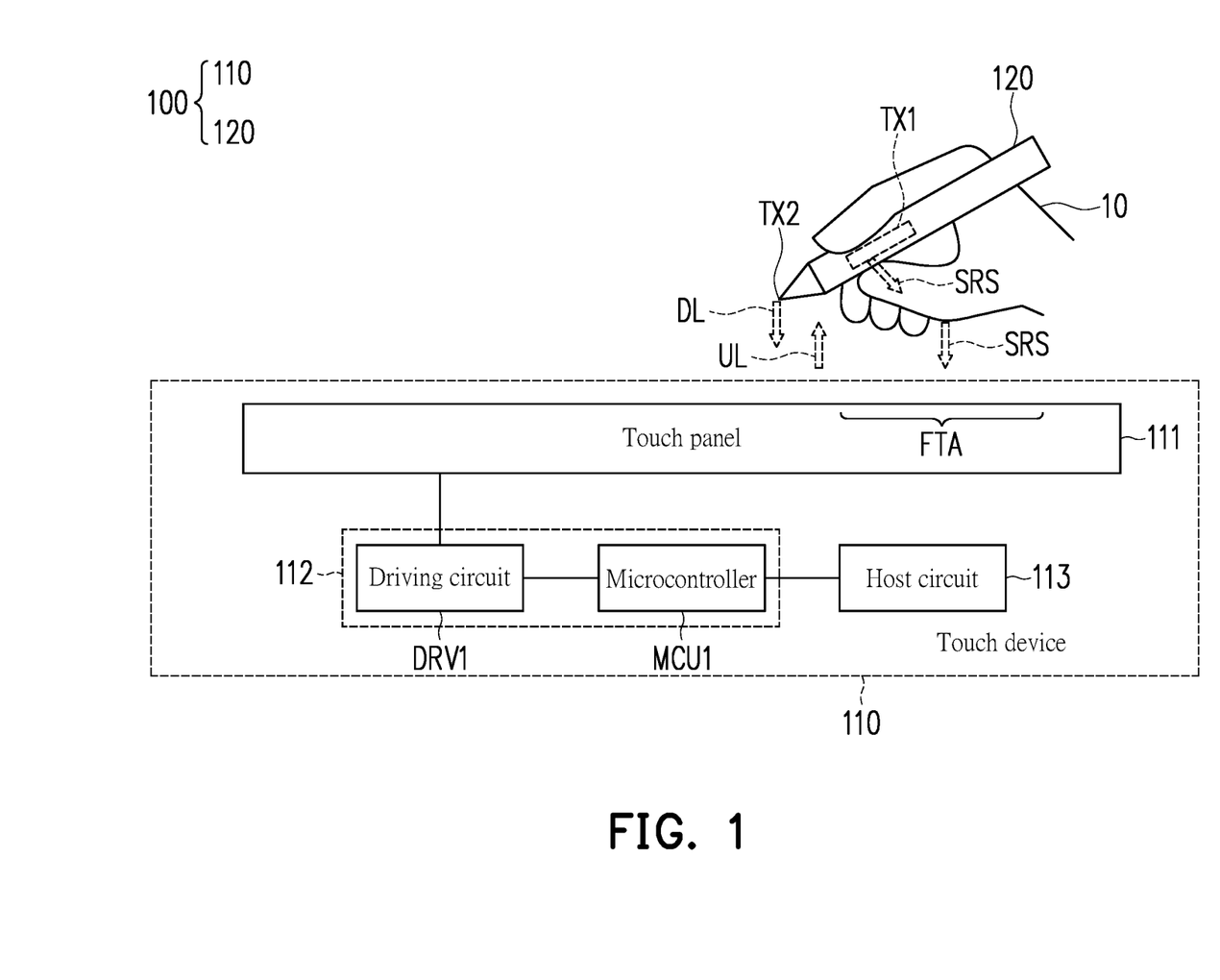
FIG. 1 is a schematic view of an operation scenario of a touch system according to an embodiment of the disclosure.

FIG. 1 is a schematic view of an operation scenario of a touch system 100 according to an embodiment of the disclosure. The touch system 100 includes a touch device 110 and a stylus 120. Based on the actual design, the touch device 110 may be implemented as a tablet computer, a smart phone, a monitor, a notebook computer, or other electronic equipment. A tip portion of the stylus 120 is provided with a transmission electrode TX2. The touch panel 111 of the touch device 110 may detect a touch event. When the stylus 120 is located above the touch panel 111, the touch device 110 may transmit an uplink signal UL to the stylus 120 through the touch panel 111, and receive a downlink signal DL sent by the transmission electrode TX2 of the tip portion of the stylus 120, so as to perform an active stylus touch detection operation. A user may operate the stylus 120 to write on the touch panel 111 of the touch device 110.

A hand 10 of the user may hold a holding portion (for example, the body) of the stylus 120 to use/operate the stylus 120 on the touch panel 111. When the tip portion of the stylus 120 touches the touch panel 111, the palm (or the wrist) often touches the touch panel 111 by mistake. A contact area (a false touch area FTA) of the palm (or the wrist) on the touch panel 111 should be ignored. When the tip portion of the stylus 120 touches the touch panel 111, the touch device 110 may define the false touch area FTA of the hand 10 based on the position of the tip portion of the stylus on the touch panel 111. However, during the process of the stylus 120 held by the hand 10 approaching the touch panel 111, the palm (or the wrist) usually touches the touch panel 111 first, and the tip portion of the stylus 120 then touches the touch panel 111. Before the tip portion touches the touch panel 111, the touch device 110 cannot use the position of the tip portion on the touch panel 111 to define the false touch area FTA of the hand 10.

In the embodiment shown in FIG. 1, the holding portion of the stylus 120 is provided with a transmission electrode TX1. In the case where the hand 10 holds the stylus 120, the transmission electrode TX1 may transmit a suppressing report signal SRS to the touch panel 111 through the hand 10. The touch device 110 may detect the suppressing report signal SRS of the transmission electrode TX1 through the touch panel 111. Based on the suppressing report signal SRS of the hand 10, the touch device 110 may determine the false touch area FTA of the hand 10 on the touch panel 111. When the hand 10 touches the false touch area FTA by mistake, the touch device 110 may instantly ignore the touch event of the false touch area FTA.

Figure 2:
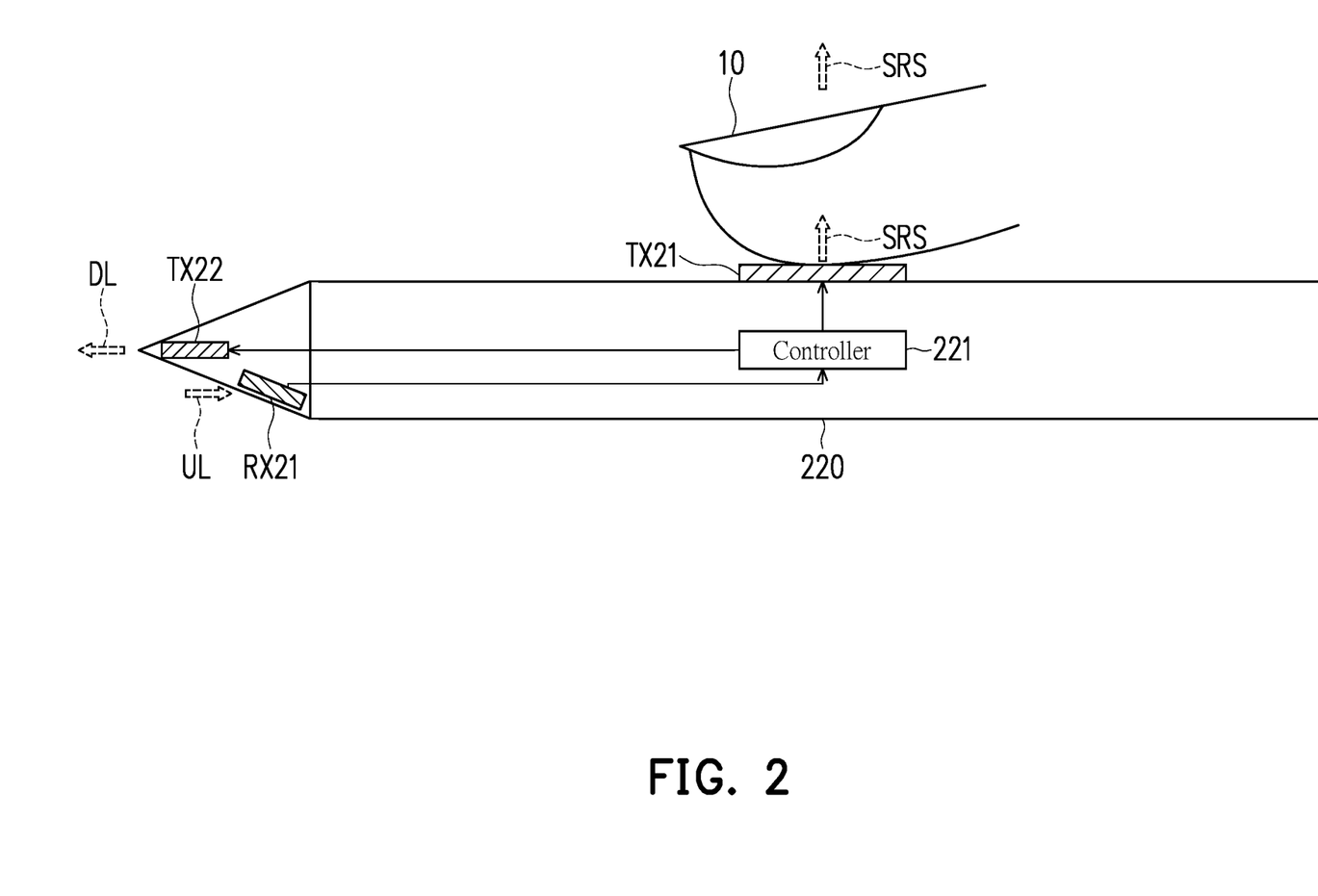
FIG. 2 is a schematic view of a circuit block of a stylus according to an embodiment of the disclosure.

FIG. 2 is a schematic view of a circuit block of a stylus 220 according to an embodiment of the disclosure. The stylus 220 shown in FIG. 2 may be used as an example of the stylus 120 shown in FIG. 1. The stylus 220 shown in FIG. 2 includes a controller 221, a transmission electrode TX21, a transmission electrode TX22, and a receive electrode RX21. The transmission electrodes TX21 and TX22 shown in FIG. 2 may be used as an example of the transmission electrodes TX1 and TX2 shown in FIG. 1. The controller 221 shown in FIG. 2 is coupled to the transmission electrode TX21, the transmission electrode TX22, and the receive electrode RX21. Please refer to FIG. 1 and FIG. 2. When the stylus 220 is located above the touch panel 111, the touch device 110 may transmit the uplink signal UL to the stylus 220 through the touch panel 111. The tip portion of the stylus 220 is provided with the receive electrode RX21. The controller 221 may receive the uplink signal UL from the touch panel 111 through the receive electrode RX21. The tip portion of the stylus 220 is provided with the transmission electrode TX22. In the case where the tip portion is close to the touch panel 111, the controller 221 may transmit the downlink signal DL to the touch panel 111 through the transmission electrode TX22. Based on the downlink signal DL of the transmission electrode TX22, the touch device 110 may judge a touch position of the tip portion of the stylus 220 on the touch panel 111.

The controller 221 may also transmit the suppressing report signal SRS through the transmission electrode TX21. The hand 10 of the user may hold the body of the stylus 220 to use/operate the stylus 220 on the touch panel 111. The body (the holding portion) of the stylus 220 is provided with the transmission electrode TX21. In the embodiment shown in FIG. 2, when the hand 10 holds the body (the holding portion) of the stylus 220, the transmission electrode TX21 electrically contacts the hand 10. In the case where the hand 10 of the user holds the stylus 220, the transmission electrode TX21 may transmit the suppressing report signal SRS to the touch panel 111 through the hand 10. The suppressing report signal SRS is different from the downlink signal DL. The suppressing report signal SRS is used to make the touch device 110 to ignore the touch event of the hand 10 on the false touch area FTA of the touch panel 111.

The embodiment does not limit the geometric layout of the transmission electrode TX21. The following will illustrate several examples of the geometric layout of the transmission electrode TX21.

Figure 3:
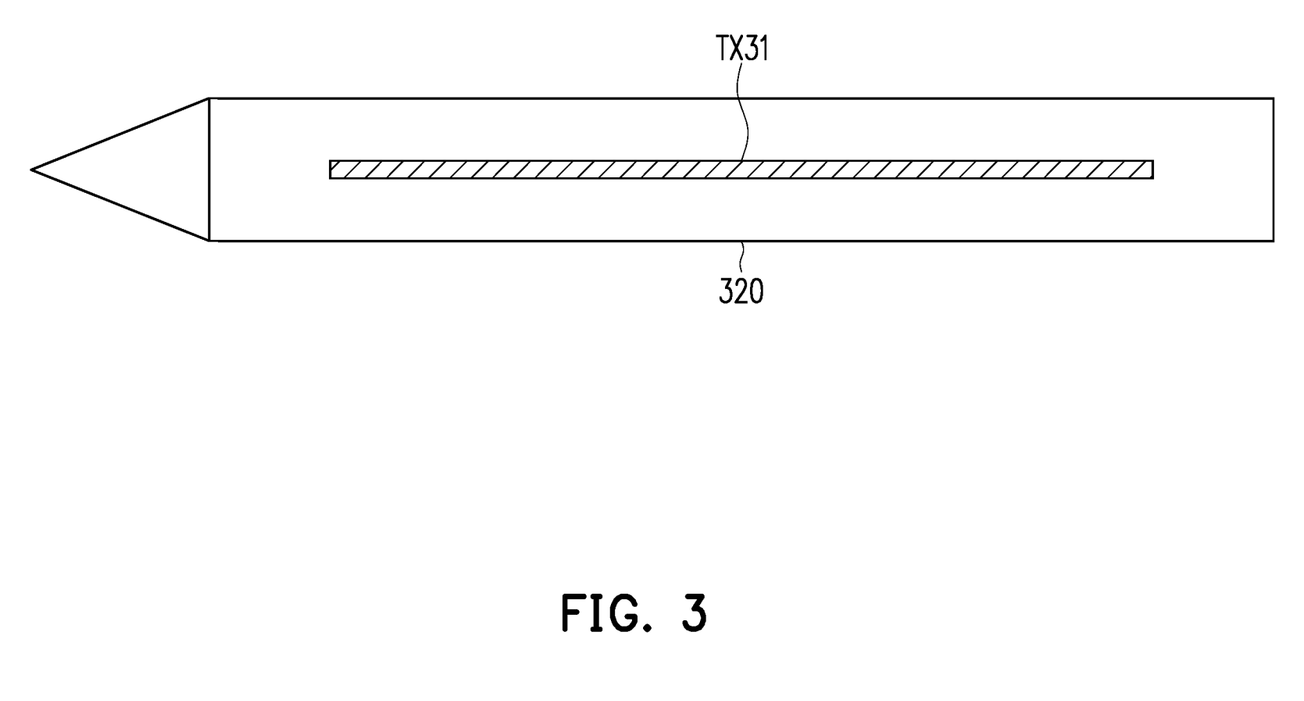
FIG. 3 is a schematic view of a geometric layout of a transmission electrode according to an embodiment of the disclosure.

FIG. 3 is a schematic view of the geometric layout of the transmission electrode TX31 according to an embodiment of the disclosure. The stylus 320 and the transmission electrode TX31 shown in FIG. 3 may be used as an example of the stylus 120 and the transmission electrode TX1 shown in FIG. 1, or used as an example of the stylus 220 and the transmission electrode TX21 shown in FIG. 2. In the embodiment shown in FIG. 3, the transmission electrode TX31 is a wire disposed on the body (the holding portion) of the stylus 320. When the hand 10 of the user holds the body of the stylus 120, the hand 10 may receive/transmit the suppressing report signal SRS on the transmission electrode TX31.

Figure 4:
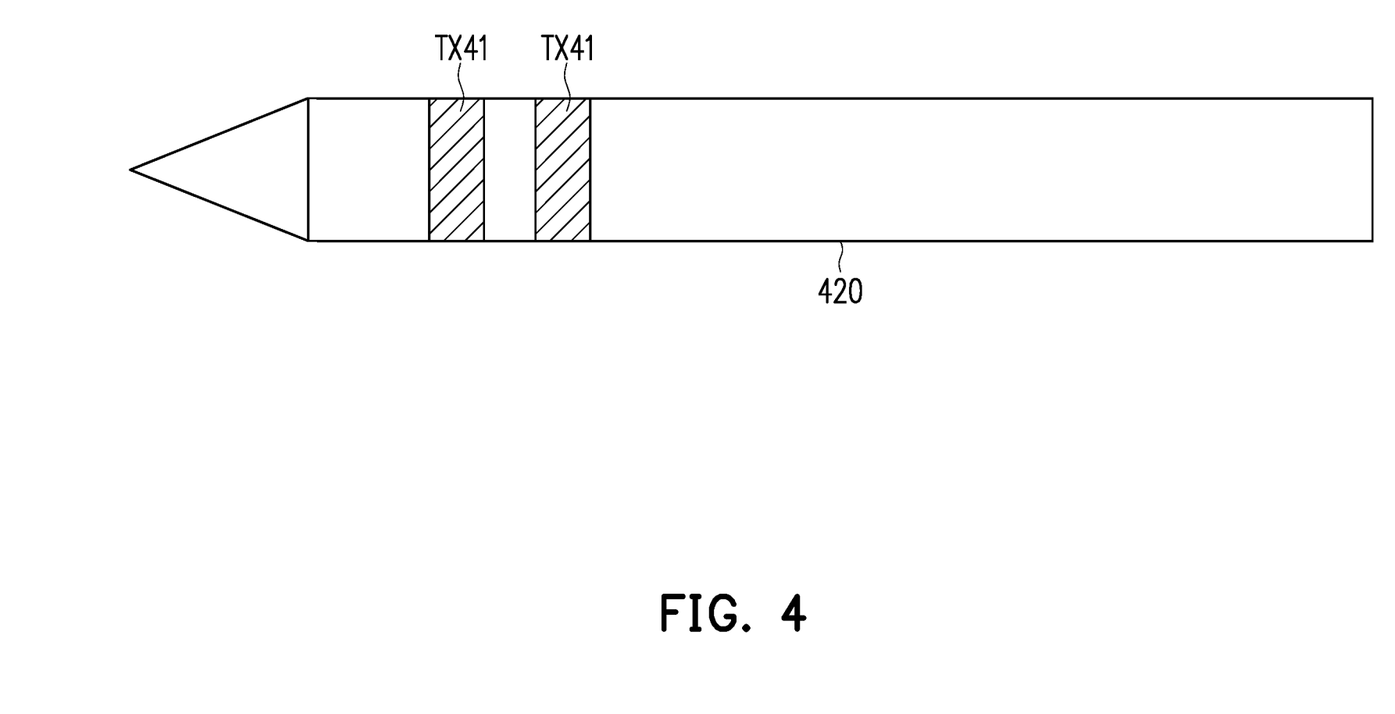
FIG. 4 is a schematic view of a geometric layout of a transmission electrode according to another embodiment of the disclosure.

FIG. 4 is a schematic view of the geometric layout of the transmission electrode TX41 according to another embodiment of the disclosure. The stylus 420 and the transmission electrode TX41 shown in FIG. 4 may be used as an example of the stylus 120 and the transmission electrode TX1 shown in FIG. 1, or used as an example of the stylus 220 and the transmission electrode TX21 shown in FIG. 2. In the embodiment shown in FIG. 4, the transmission electrode TX41 is multiple (or one) conductor rings disposed on the body (the holding portion) of the stylus 420. When the hand 10 of the user holds the body of the stylus 420, the hand 10 may receive/transmit the suppressing report signal SRS on the transmission electrode TX41.

Figure 5:
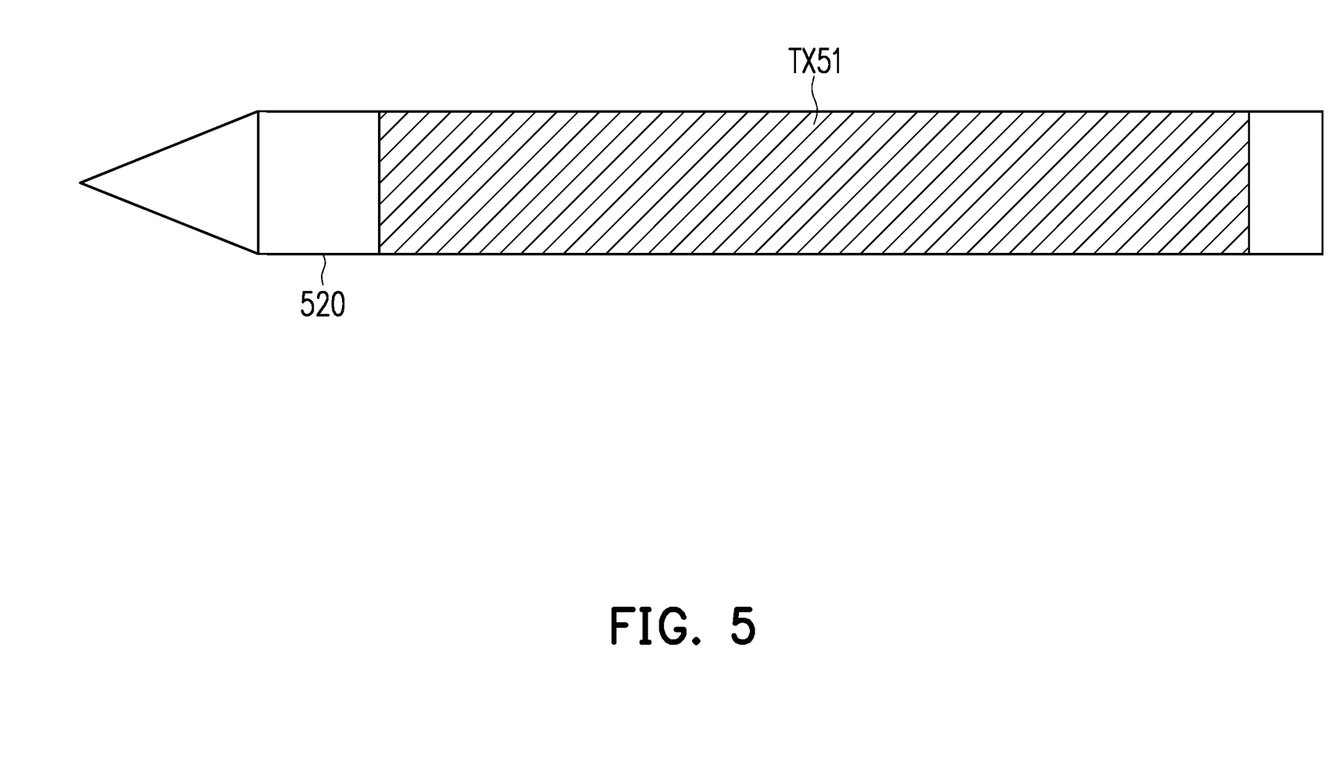
FIG. 5 is a schematic view of a geometric layout of a transmission electrode according to yet another embodiment of the disclosure.

FIG. 5 is a schematic view of the geometric layout of the transmission electrode TX51 according to yet another embodiment of the disclosure. The stylus 520 and the transmission electrode TX51 shown in FIG. 5 may be used as an example of the stylus 120 and the transmission electrode TX1 shown in FIG. 1, or used as an example of the stylus 220 and the transmission electrode TX21 shown in FIG. 2. In the embodiment shown in FIG. 5, the transmission electrode TX51 is a conductor surface covering the body (the holding portion) of the stylus 520. When the hand 10 of the user holds the body of the stylus 520, the hand 10 may receive/transmit the suppressing report signal SRS on the transmission electrode TX51.

Figure 6:
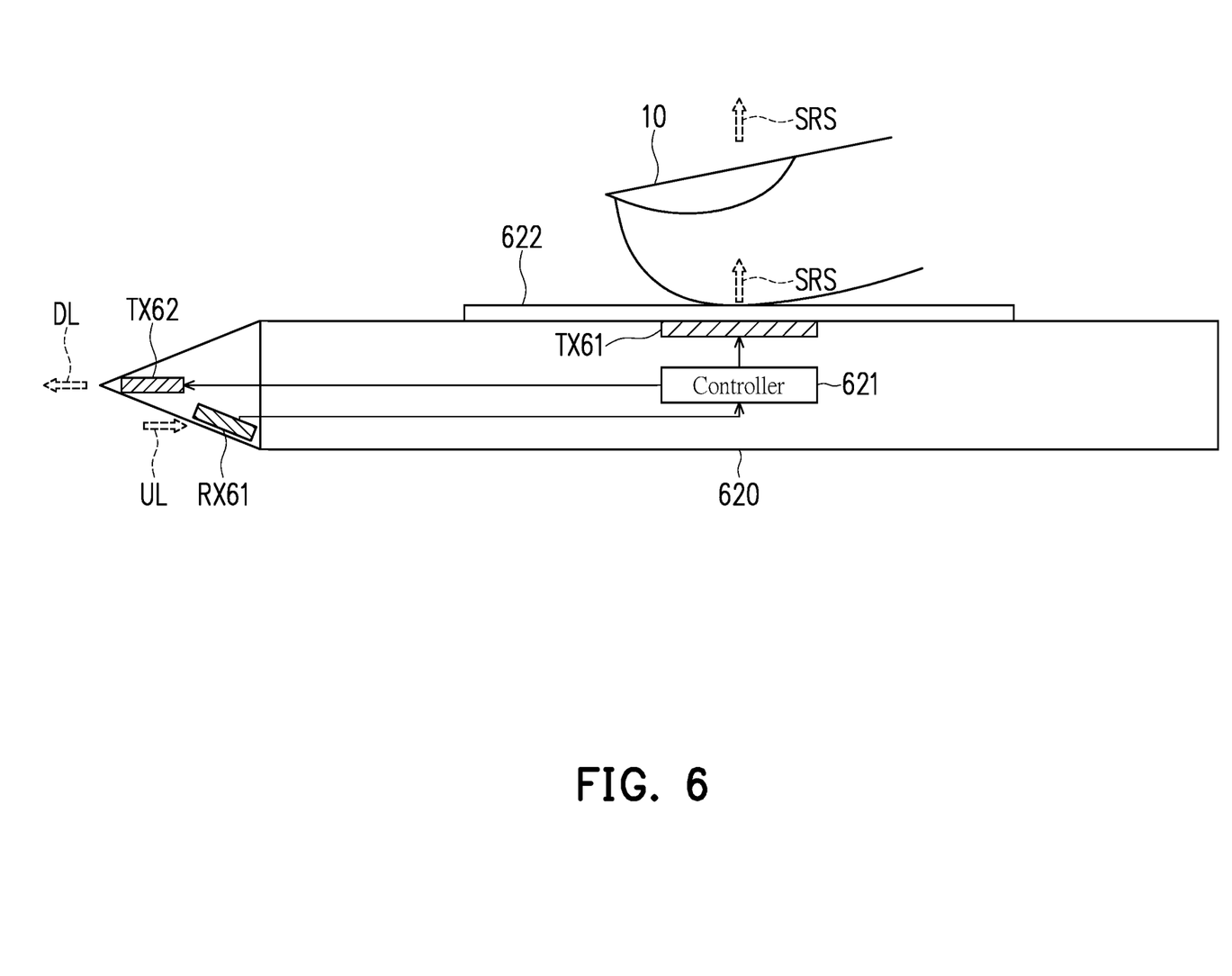
FIG. 6 is a cross-sectional schematic view of a transmission electrode of a stylus according to another embodiment of the disclosure.

FIG. 6 is a cross-sectional schematic view of the transmission electrode TX61 of the stylus 120 according to another embodiment of the disclosure. For the stylus 620, the controller 621, the transmission electrode TX61, the transmission electrode TX62, and the receive electrode RX61 shown in FIG. 6, reference may be made to the relevant description of the stylus 220, the controller 221, the transmission electrode TX21, the transmission electrode TX22, and the receive electrode RX21 shown in FIG. 2, so details are not repeated here. Different from the embodiment shown in FIG. 2, the stylus 620 shown in FIG. 6 further includes an insulating layer 622. The insulating layer 622 is disposed on the transmission electrode TX61. When the hand 10 holds the body (the holding portion) of the stylus 620, the insulating layer 622 may prevent the transmission electrode TX61 from electrically contacting the hand 10.

FIG. 1 shows a schematic view of a circuit block of the touch device 110. The touch device 110 includes the touch panel 111, a touch processing circuit 112, and a host circuit 113. According to the actual design, the host circuit 113 may include a central processing unit (CPU) and/or other circuits. The touch processing circuit 112 may be a touch display driver integration (TDDI) circuit or other touch control circuits. Based on the control of the host circuit 113, the touch processing circuit 112 may drive/control the touch panel 111, so that the touch panel 111 detects the touch event. According to different designs, in some embodiments, the touch processing circuit 112 and (or) the host circuit 113 may be implemented as hardware circuits. In some other embodiments, the touch processing circuit 112 and (or) the host circuit 113 may be implemented in the form of firmware, software (that is, program), or a combination of the two. In yet other embodiments, the touch processing circuit 112 and (or) the host circuit 113 may be implemented in the form of a combination of multiple of hardware, firmware, and software.

In terms of the form of hardware, the touch processing circuit 112 and (or) the host circuit 113 may be implemented as logic circuits on an integrated circuit. For example, the relevant functions of the touch processing circuit 112 and (or) the host circuit 113 may be implemented in one or more controllers, microcontrollers, microprocessors, application-specific integrated circuits (ASIC), digital signal processors (DSP), field programmable gate arrays (FPGA), central processing units (CPU), and/or various logic blocks, modules, and circuits in other processing units. The relevant functions of the touch processing circuit 112 and (or) the host circuit 113 may be implemented as hardware circuits such as various logic blocks, modules, and circuits in integrated circuits by using hardware description languages (for example, Verilog HDL or VHDL) or other suitable programming languages.

In terms of the form of software and/or the form of firmware, the relevant functions of the touch processing circuit 112 and (or) the host circuit 113 may be implemented as programming codes. For example, the touch processing circuit 112 and (or) the host circuit 113 are implemented by using general programming languages (for example, C, C++, or assembly language) or other suitable programming languages. The programming codes may be recorded/stored in a "non-transitory machine-readable storage medium". In some embodiments, the non-transitory machine-readable storage medium includes, for example, a semiconductor memory and/or a storage device. The semiconductor memory includes a memory card, a read only memory (ROM), a flash memory, a programmable logic circuit, or other semiconductor memories. The storage device includes a tape, a disk, a hard disk drive (HDD), a solid-state drive (SSD), or other storage devices. An electronic equipment (for example, a CPU, a controller, a microcontroller, or a microprocessor) may read and execute the programming codes from the non-transitory machine-readable storage medium, thereby implementing the relevant functions of the touch processing circuit 112 and (or) the host circuit 113. Alternatively, the programming codes may be provided to the electronic equipment via any transmission medium (for example, a communication network, a broadcast wave, etc.). The communication network is, for example, the Internet, a wired communication network, a wireless communication network, or other communication media.

Figure 7:
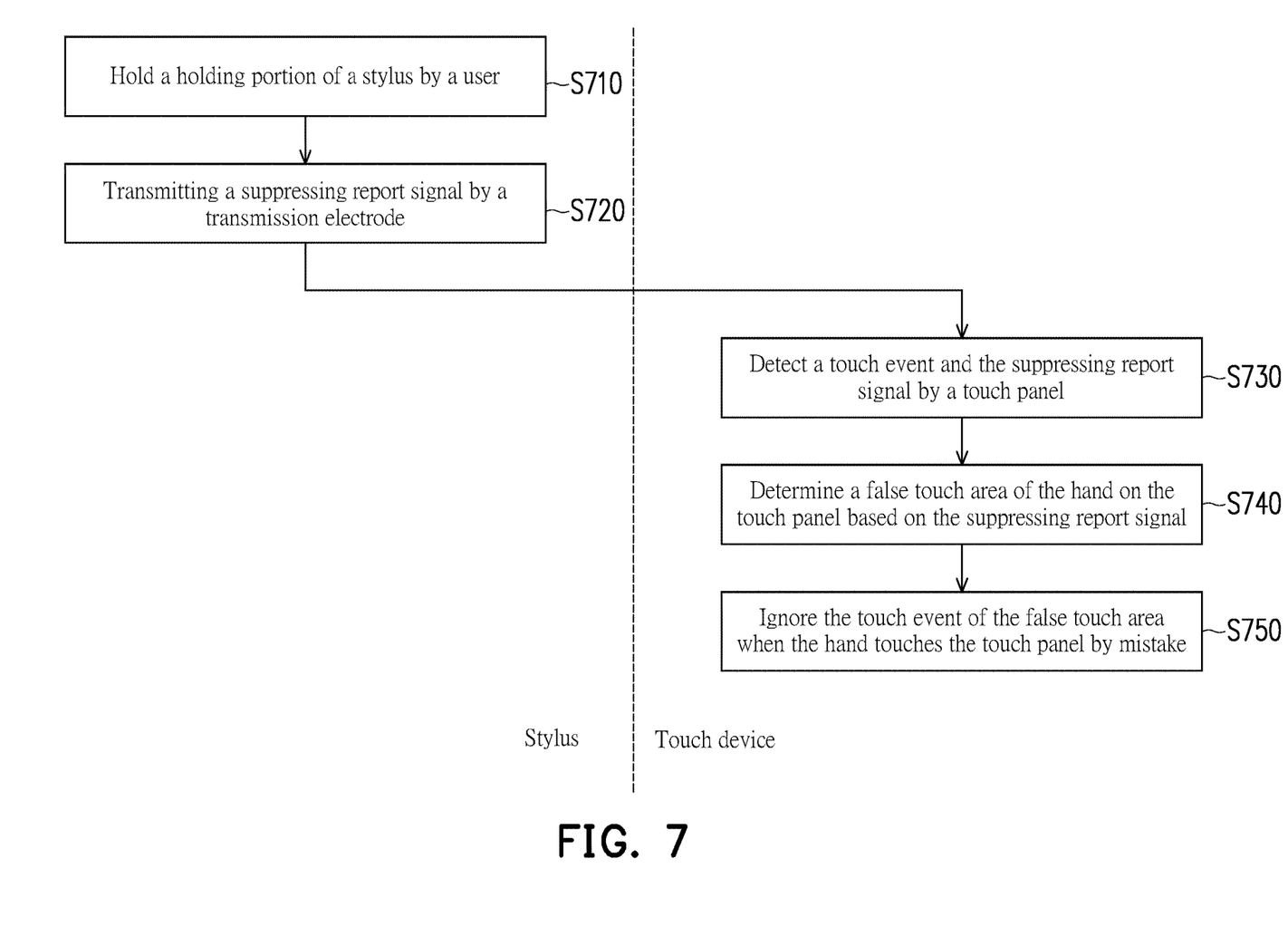
FIG. 7 is a schematic flowchart of an operation method according to an embodiment of the disclosure.

FIG. 7 is a schematic flowchart of an operation method according to an embodiment of the disclosure. Please refer to FIG. 1 and FIG. 7. In Step S710, the holding portion (for example, the body) of the stylus 120 may be held by the user to use the stylus 10. In the case where the hand 10 of the user holds the stylus 120, the transmission electrode TX1 disposed on the body (the holding portion) may transmit the suppressing report signal SRS to the touch panel 111 through the hand 10 (Step S720). The suppressing report signal SRS is used to make the touch device 110 to ignore the touch event of the hand 10 on the false touch area FTA of the touch panel 111. The touch processing circuit 112 is coupled to the touch panel 111 to detect the touch event and the suppressing report signal SRS (Step S730). In Step S740, the touch processing circuit 112 may determine the false touch area FTA of the hand 10 on the touch panel 111 based on the suppressing report signal SRS. When the hand 10 touches the false touch area FTA of the touch panel 111 by mistake, the touch processing circuit 112 may ignore the touch event of the false touch area FTA (Step S750).

In summary, the holding portion (for example, the body) of the stylus 120 described in the above embodiments is provided with the transmission electrode TX1. When the hand 10 holds the stylus 120 and approaches the touch panel 111, the suppressing report signal SRS of the transmission electrode TX1 may be transmitted to the touch panel 111 through the hand 10. The touch device 110 detects the suppressing report signal SRS of the hand 10 through the touch panel 111 to determine the false touch area FTA of the hand 10 on the touch panel 111. Therefore, in the case where the hand 10 holds the stylus 120, the touch device 110 may instantly and effectively identify the false touch area FTA of the hand 10. When the palm (or the wrist) touches the panel 111 by mistake, the touch device 110 may ignore the touch event of the false touch area FTA based on the suppressing report signal SRS.

The implementation manners of the touch processing circuit 112 may be determined according to the actual design. For example, the touch processing circuit 112 shown in FIG. 1 includes a driving circuit DRV1 and a microcontroller MCU1. The driving circuit DRV1 is used to be coupled to the touch panel 111. In the case where the hand 10 of the user holds the stylus 120, the stylus 120 may transmit the suppressing report signal SRS to the touch panel 111 through the hand 10. The driving circuit DRV1 may detect the suppressing report signal SRS of the transmission electrode TX1 of the stylus 120 through the touch panel 111. The microcontroller MCU1 is coupled to the driving circuit DRV1. The microcontroller MCU1 may determine the false touch area FTA of the hand 10 on the touch panel 111 based on the suppressing report signal SRS. When the hand 10 touches the false touch area FTA of the touch panel 111 by mistake, the microcontroller MCU1 may ignore the touch event of the false touch area FTA.

Figure 8:
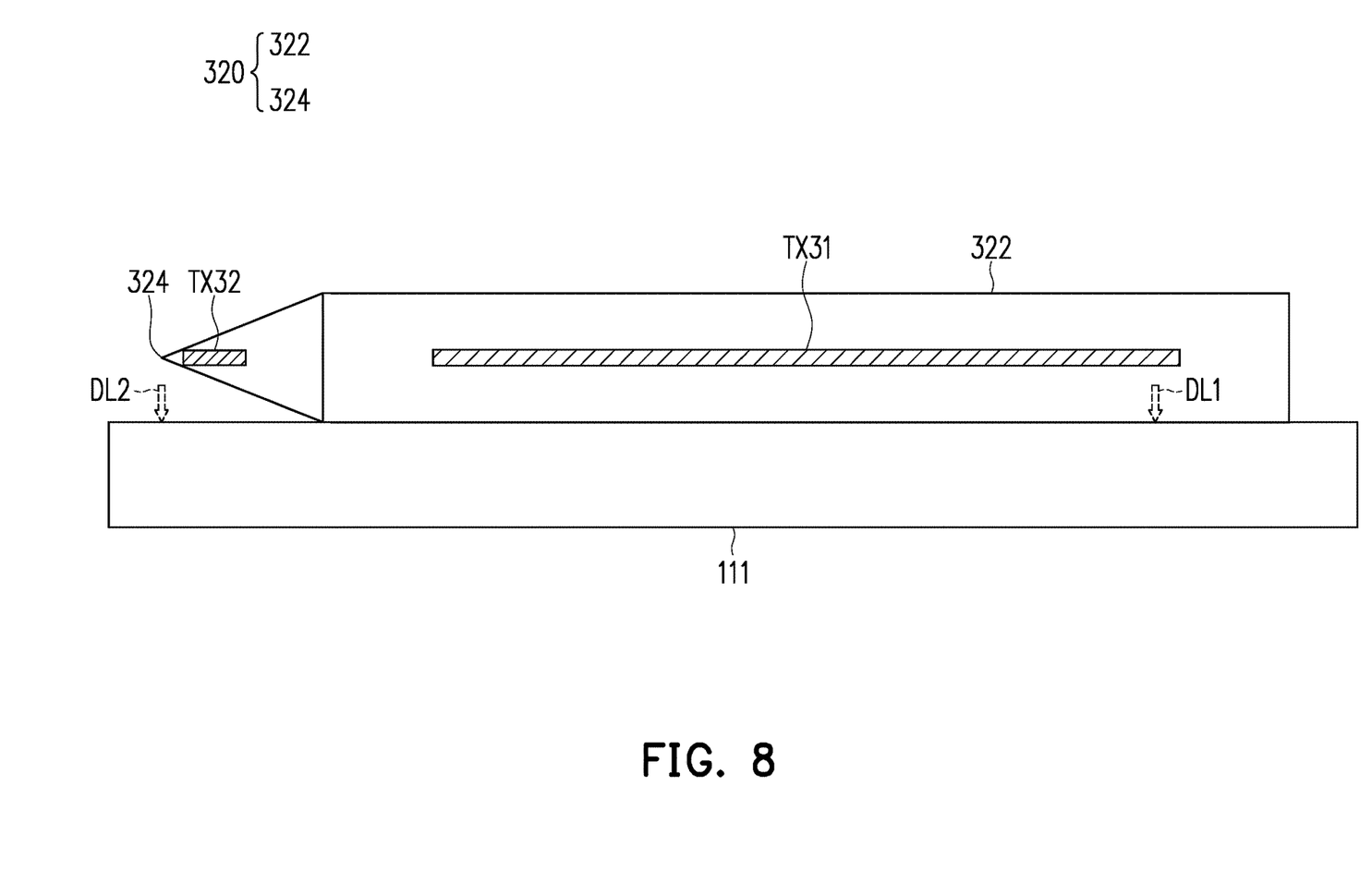
FIG. 8 is a schematic view of a case that the stylus is laid on the touch panel of the touch device according to an embodiment of the disclosure.
Figure 9:
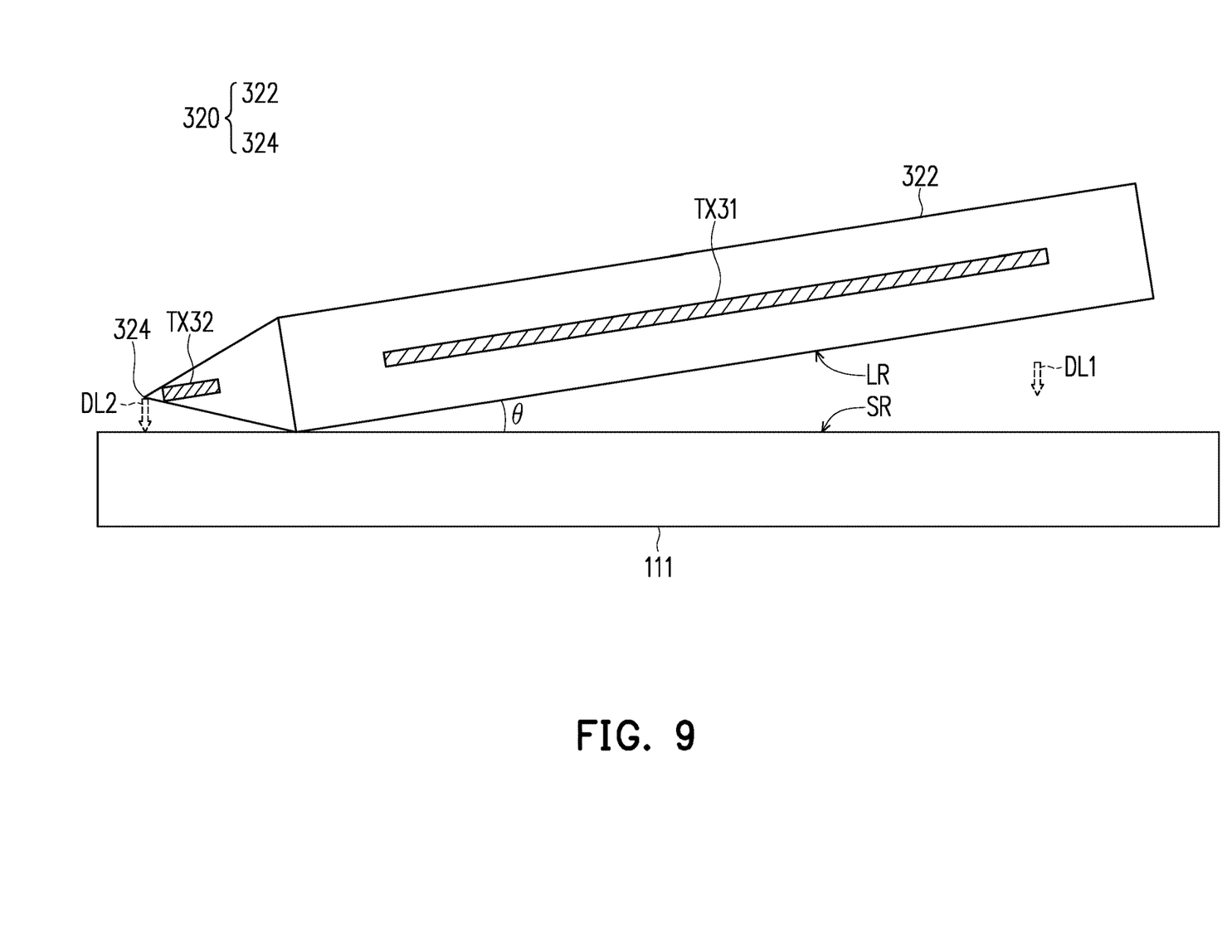
FIG. 9 is a schematic view of a case that the stylus is tilted for normal usage according to an embodiment of the disclosure.

FIG. 8 is a schematic view of a case that the stylus is laid on the touch panel of the touch device according to an embodiment of the disclosure. FIG. 9 is a schematic view of a case that the stylus is tilted for normal usage according to an embodiment of the disclosure. Referring to FIG. 8 and FIG. 9, taking the touch device 110 of FIG. 1 and the stylus 320 of FIG. 3 for example, the touch device 110 can effectively identifies the touch event that the stylus 320 is laid on the touch panel 111 based on at least one first downlink signal DL1 from the first transmission electrode TX31.

To be specific, the stylus 320 includes a holding portion 322, a tip portion 324, the first transmission electrode TX31 and a second transmission electrode TX32. The first transmission electrode TX31 is disposed on the holding portion 322, and the second transmission electrode TX32 is disposed at the tip portion 324. In FIG. 9, the holding portion 322 has a reference line LR on the surface thereof, and the touch panel 111 has a reference surface SR facing to the stylus 320. There is an angle θ existing between the reference line LR and the reference surface SR as illustrated in FIG. 9. The smaller the angle θ, the more tilted the stylus 320. In FIG. 8, the angle θ between the reference line LR and the reference surface SR is substantially equal to zero when the stylus 320 is laid on the touch panel 111.

The first transmission electrode TX31 transmits at least one first downlink signal DL1 to the touch device 110, and the at least one first downlink signal DL1 is configured to determine the touch event that the stylus 320 is laid on the touch panel 111 of the touch device 110. Next, the touch processing circuit 112 receives the at least one first downlink signal DL1 from the holding portion 322 of the stylus 320 through the touch panel 111. The touch processing circuit 112 is configured to determine the touch event that the stylus 320 is laid on the touch panel 111 based on the at least one first downlink signal DL1. The touch panel 111 senses the stronger first downlink signal DL1 in FIG. 8 than in FIG. 9 because the end of the holding portion 322 opposite to the tip portion 324 is closer to the touch panel 111 in FIG. 8.

A threshold value can be set for the touch event that the stylus 320 is laid on the touch panel 111. When the touch processing circuit 112 determines that the strength of the first downlink signal DL1 is larger than or equal to the threshold value, the touch processing circuit 112 identifies the touch event that the stylus 320 is laid on the touch panel 111, as illustrated in FIG. 8.

When the touch event is determined as that the stylus 320 is laid on the touch panel 111, the touch processing circuit 112 does not report the touch location of the stylus 320 or stabilizes the stylus's cursor on the touch panel 111 to provide a good user experience.

On the contrary, when the touch processing circuit 112 determines that the strength of the first downlink signal DL1 is smaller than the threshold value, the touch processing circuit 112 identifies the touch event that the stylus 320 is tilted for normal usage, as illustrated in FIG. 9.

When the touch event is determined as that the stylus 320 is tilted for normal usage, the touch processing circuit 112 may report the touch location of the stylus 320 on the touch panel 111 based on the second downlink signal DL2.

In addition, the angle θ between the reference line LR and the reference surface SR may be determined based on the first downlink signal DL1. To be specific, the touch processing circuit 112 is further to configured to determine the angle θ based on the first downlink signal DL1. For example, a lookup table may record the relationship between the values of the angle θ and the strength of the first downlink signal DL1. The touch processing circuit 112 can determine the values of the angle θ based on the lookup table and the sensed strength of the first downlink signal DL1.

In FIG. 8 and FIG. 9, the second transmission electrode TX32 transmits a second downlink signal DL2 to the touch device 110, and the second downlink signal DL2 is configured to determine a touch position of the tip portion 324 on the touch panel 111 of the touch device 110. Next, the touch processing circuit 112 receives the second downlink signal DL2 from the tip portion 324 of the stylus 320 through the touch panel 111. The touch processing circuit 112 determines the touch position of the tip portion 324 on the touch panel 111 based on the second downlink signal DL2. The method for determining the touch position of the tip portion 324 can be obtained, taught and suggested with reference to common knowledge in the related art.

In addition, the second downlink signal DL2 is also configured to determine the touch event that the stylus 320 is laid on the touch panel 111 of the touch device 110. The touch processing circuit 112 is further configured to determine the touch event that the stylus 320 is laid on the touch panel 111 of the touch device 110 based on the second downlink signal DL2. The touch panel 111 senses the weaker second downlink signal DL2 in FIG. 8 than in FIG. 9 because the tip portion 324 of FIG. 8 is farther away from the touch panel 111.

For example, another threshold value can be set for the touch event that the stylus 320 is laid on the touch panel 111. When the touch processing circuit 112 determines that the strength of the second downlink signal DL2 is smaller than or equal to the another threshold value, the touch processing circuit 112 identifies the touch event that the stylus 320 is laid on the touch panel 111, as illustrated in FIG. 8. On the contrary, when the touch processing circuit 112 determines that the strength of the second downlink signal DL2 is larger than the another threshold value, the touch processing circuit 112 identifies the touch event that the stylus 320 is tilted for normal usage, as illustrated in FIG. 9.

The angle θ can also be determined based on the second downlink signal DL2, and the touch processing circuit 112 is further configured to determine the angle θ based on the second downlink signal DL2. Another lookup table may record the relationship between the values of the angle θ and the strength of the second downlink signal DL2. The touch processing circuit 112 can determine the values of the angle θ based on the another lookup table and the sensed strength of the second downlink signal DL2.

Therefore, the touch processing circuit 112 can determine the touch event that the stylus 320 is laid on the touch panel 111 based on the first downlink signal DL1 and/or the second downlink signal DL2.

In the present embodiment, to distinguish the first downlink signal DL1 and the second downlink signal DL2, the first downlink signal DL1 and the second downlink signal DL2 may have different frequencies, and the first downlink signal DL1 and the second downlink signal DL2 are transmitted to the touch processing circuit 112 at the same time. The touch processing circuit 112 receives the first downlink signal DL1 and the second downlink signal DL2 having the different frequencies at the same time.

Alternatively, the first downlink signal DL1 and the second downlink signal DL2 may have the same frequency, and the first downlink signal DL1 and the second downlink signal DL2 are transmitted to the touch processing circuit 112 at different times. The touch processing circuit 112 receives the first downlink signal DL1 and the second downlink signal DL2 having the same frequency at the different times.

In the present embodiment, the implementation manners of the touch processing circuit 112 may be determined according to the actual design. Taking the touch processing circuit 112 shown in FIG. 1 for example. The driving circuit DRV1 receives the at least one first downlink signal DL1 from the holding portion 322 of the stylus 320 through the touch panel 111. The microcontroller MCU1 is configured to determine the touch event that the stylus 320 is laid on the touch panel 111 based on the at least one first downlink signal DL1.

In the embodiment of FIG. 8 and FIG. 9, the stylus 320 of FIG. 3 is taken for example, and the first transmission electrode TX31 transmits one first downlink signal DL1 to the touch device 110 for determining the touch event, but the disclosure is not limited thereto. In an embodiment, the stylus 420 of FIG. 4, the two separate first transmission electrodes TX41 may transmit two first downlink signals DL1 to the touch device 110 for determining the touch event.

Figure 10:
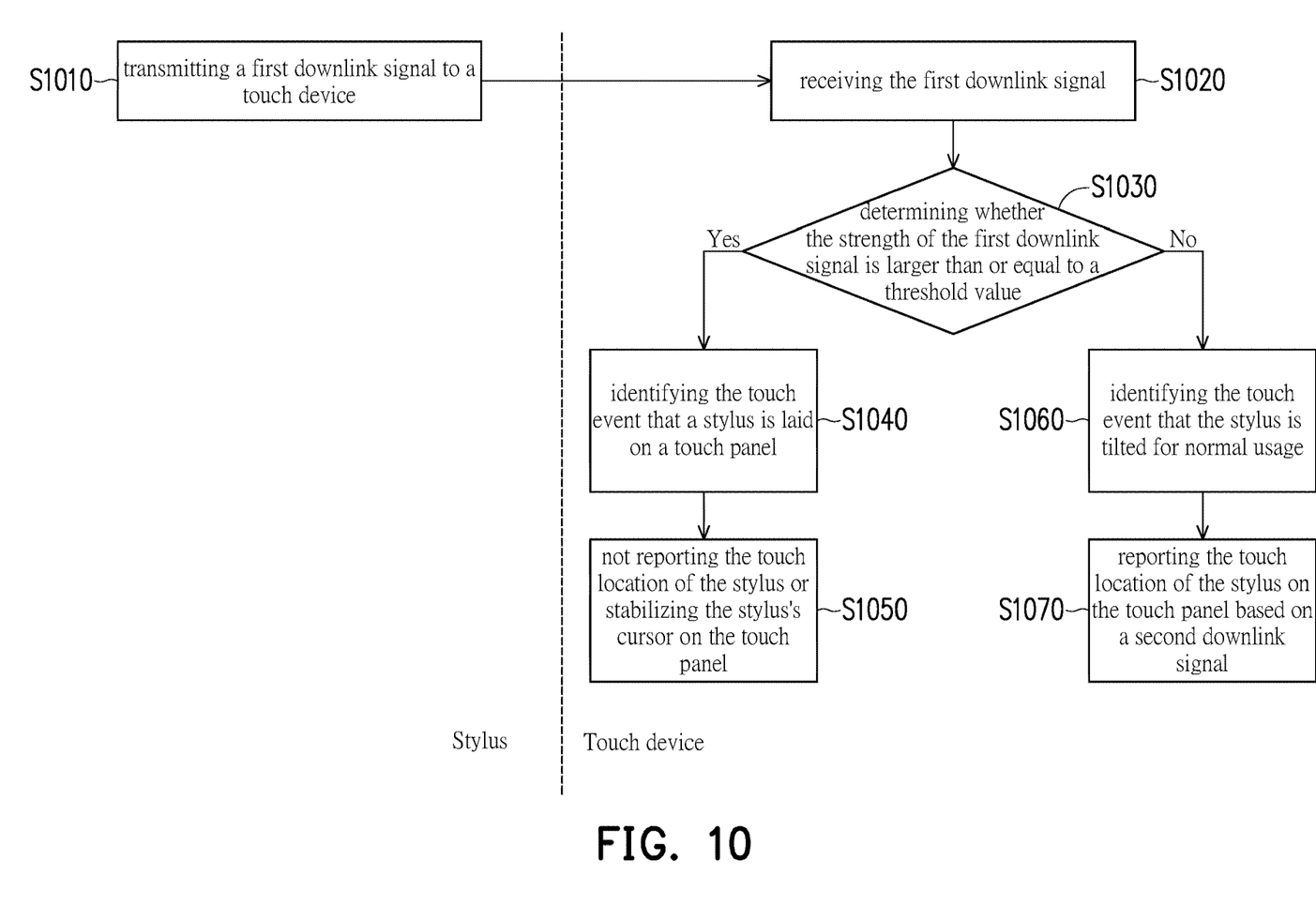
FIG. 10 is a schematic flowchart of an operation method according to an embodiment of the disclosure.

FIG. 10 is a schematic flowchart of an operation method according to an embodiment of the disclosure. Please refer to FIG. 1 and FIG. 8 to FIG. 10. In Step S1010, the first transmission electrode TX31 transmits the first downlink signal DL1 to the touch device 110. In Step S1020, the touch processing circuit 112 receives the first downlink signal DL1 from the first transmission electrode TX31 through the touch panel 111. In Step S1030, the touch processing circuit 112 determines whether the strength of the first downlink signal DL1 is larger than or equal to a threshold value.

When the strength of the first downlink signal DL1 is larger than or equal to the threshold value, the flow goes to Step S1040, and the touch processing circuit 112 identifies the touch event that the stylus 320 is laid on the touch panel 111, as illustrated in FIG. 8. Next, in Step S1050, the touch processing circuit 112 does not report the touch location of the stylus 320 or stabilizes the stylus's cursor on the touch panel 111.

When the strength of the first downlink signal DL1 is smaller than the threshold value, the flow goes to Step S1060, and the touch processing circuit 112 identifies the touch event that the stylus 320 is tilted for normal usage, as illustrated in FIG. 9. Next, in Step S1070, the touch processing circuit 112 reports the touch location of the stylus 320 on the touch panel 111 based on the second downlink signal DL2.

In summary, in the disclosure, the holding portion of the stylus is wrapped in a conductive transmission electrode for emitting a downlink signal, and the touch device can effectively identify the touch event that the stylus is laid on the touch panel based on the downlink signal.

Although the disclosure has been disclosed in the embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A stylus, comprising:
   a holding portion; and
   a first transmission electrode, disposed on the holding portion, wherein the first transmission electrode transmits at least one first downlink signal to a touch device, wherein the at least one first downlink signal is used to determine a touch event that the stylus is laid on a touch panel of the touch device, wherein the holding portion has a reference line on a surface of the holding portion, and the touch panel has a reference surface facing to the stylus,
   wherein the touch event that the stylus is laid on the touch panel is determined according to a comparison result between strength of only the first downlink signal and a threshold, and
   wherein an angle between the reference line and the reference surface is determined from a lookup table only according to the strength of the first downlink signal.

2. The stylus according to claim 1, wherein the holding portion has the reference line on the surface of the holding portion, and the touch panel has the reference surface facing to the stylus, wherein the angle between the reference line and the reference surface is equal to zero when the stylus is laid on the touch panel.

3. The stylus according to claim 2, wherein the angle is determined based on the at least one first downlink signal.

4. The stylus according to claim 2, further comprising:
   a tip portion; and
   a second transmission electrode, disposed at the tip portion, wherein the second transmission electrode transmits a second downlink signal to the touch device, and the second downlink signal is used to determine a touch position of the tip portion on the touch panel of the touch device.

5. The stylus according to claim 4, wherein the second downlink signal is further configured to determine the touch event that the stylus is laid on the touch panel of the touch device, and the angle is further determined based on the second downlink signal.

6. The stylus according to claim 4, wherein the at least one first downlink signal and the second downlink signal has different frequencies, and the at least one first downlink signal and the second downlink signal are transmitted at a same time.

7. The stylus according to claim 4, wherein the at least one first downlink signal and the second downlink signal has a same frequency, and the at least one first downlink signal and the second downlink signal are transmitted at different times.

8. A touch device, comprising:
   a touch panel; and
   a touch processing circuit, coupled to the touch panel, and receiving at least one first downlink signal from a holding portion of a stylus through the touch panel, wherein the touch processing circuit is configured to determine a touch event that the stylus is laid on the touch panel based on the at least one first downlink signal,
   wherein the holding portion has a reference line on a surface of the holding portion, and the touch panel has a reference surface facing to the stylus,
   wherein the touch event that the stylus is laid on the touch panel is determined according to a comparison result between strength of only the first downlink signal and a threshold,
   wherein an angle between the reference line and the reference surface is determined from a lookup table only according to the strength of the first downlink signal.

9. The touch device according to claim 8, wherein the holding portion has the reference line on the surface of the holding portion, and the touch panel has the reference surface facing to the stylus, wherein the angle between the reference line and the reference surface is equal to zero when the stylus is laid on the touch panel.

10. The touch device according to claim 9, wherein the touch processing circuit is configured to determine the angle based on the at least one first downlink signal.

11. The touch device according to claim 9, wherein the touch processing circuit receives a second downlink signal from a tip portion of the stylus through the touch panel, wherein the touch processing circuit is further to determine a touch position of the tip portion on the touch panel based on the second downlink signal.

12. The touch device according to claim 11, wherein the touch processing circuit is further configured to determine the touch event that the stylus is laid on the touch panel of the touch device based on the second downlink signal, and the touch processing circuit is further configured to determine the angle based on the second downlink signal.

13. The touch device according to claim 11, wherein the at least one first downlink signal and the second downlink signal has different frequencies, and the touch processing circuit receives the at least one first downlink signal and the second downlink signal at a same time.

14. The touch device according to claim 11, wherein the at least one first downlink signal and the second downlink signal has a same frequency, and the touch processing circuit receives the at least one first downlink signal and the second downlink signal at different times.

15. The touch device according to claim 8, wherein the touch processing circuit comprises:
 a driving circuit, coupled to the touch panel, wherein the driving circuit receives the at least one first downlink signal from the holding portion of the stylus through the touch panel; and
 a microcontroller, coupled to the driving circuit, wherein the microcontroller is configured to determine the touch event that the stylus is laid on the touch panel based on the at least one first downlink signal.

16. A touch processing circuit, comprising:
 a driving circuit, coupled to a touch panel, wherein the driving circuit receives at least one first downlink signal from a holding portion of a stylus through the touch panel; and
 a microcontroller, coupled to the driving circuit, wherein the microcontroller is configured to determine a touch event that the stylus is laid on the touch panel based on the at least one first downlink signal,
 wherein the holding portion has a reference line on a surface of the holding portion, and the touch panel has a reference surface facing to the stylus,
 wherein the touch event that the stylus is laid on the touch panel is determined according to a comparison result between strength of only the first downlink signal and a threshold, and
 wherein an angle between the reference line and the reference surface is determined from a lookup table only according to the strength of the first downlink signal.

17. The touch processing circuit according to claim 16, wherein the holding portion has the reference line on the surface of the holding portion, and the touch panel has the reference surface facing to the stylus, wherein the angle between the reference line and the reference surface is equal to zero when the stylus is laid on the touch panel.

18. The touch processing circuit according to claim 17, wherein the microcontroller is configured to determine the angle based on the at least one first downlink signal.

19. The touch processing circuit according to claim 17, wherein the driving circuit receives a second downlink signal from a tip portion of the stylus through the touch panel, wherein the microcontroller is further to determine a touch position of the tip portion on the touch panel based on the second downlink signal.

20. The touch processing circuit according to claim 19, wherein the microcontroller is further configured to determine the touch event that the stylus is laid on the touch panel of the touch device based on the second downlink signal, and the microcontroller is further configured to determine the angle based on the second downlink signal.

* * * * *